(12) United States Patent
Shkolnikov et al.

(10) Patent No.: US 11,927,520 B2
(45) Date of Patent: Mar. 12, 2024

(54) ROTATING LEVITATED PARTICLE IMAGING

(71) Applicant: Hewlett-Packard Development Company, L.P., Spring, TX (US)

(72) Inventors: Viktor Shkolnikov, Palo Alto, CA (US); Daixi Xin, Palo Alto, CA (US); Yang Lei, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 189 days.

(21) Appl. No.: 17/415,130

(22) PCT Filed: May 30, 2019

(86) PCT No.: PCT/US2019/034757
§ 371 (c)(1),
(2) Date: Jun. 17, 2021

(87) PCT Pub. No.: WO2020/242486
PCT Pub. Date: Dec. 20, 2020

(65) Prior Publication Data
US 2022/0074843 A1      Mar. 10, 2022

(51) Int. Cl.
*G01N 15/10*      (2006.01)
*G01N 15/00*      (2006.01)

(52) U.S. Cl.
CPC ..... *G01N 15/1031* (2013.01); *G01N 15/0227* (2013.01); *G01N 2015/0053* (2013.01)

(58) Field of Classification Search
CPC ... G01N 2015/1062; G01N 2015/1486; G01R 31/12; G02B 5/3008
See application file for complete search history.

(56) References Cited

U.S. PATENT DOCUMENTS

| | | | |
|---|---|---|---|
| 9,605,941 B2 | 3/2017 | Ozcan et al. | |
| 2011/0140706 A1 | 6/2011 | Groves et al. | |
| 2011/0189721 A1 | 8/2011 | Deutsch | |
| 2015/0212316 A1 | 7/2015 | Krishnan et al. | |
| 2017/0218424 A1 | 8/2017 | Swami et al. | |

FOREIGN PATENT DOCUMENTS

| | | | | |
|---|---|---|---|---|
| CN | 105441325 A | 3/2016 | | |
| CN | 109182444 A | 1/2019 | | |
| WO | WO-2016065056 A1 | 4/2016 | | |
| WO | WO-2017028342 A1 | 2/2017 | | |
| WO | WO-2017104556 A1 | 6/2017 | | |
| WO | WO-2018094113 A1 | 5/2018 | | |
| WO | WO-2020145995 A1 * | 7/2020 | ............... | G01N 1/14 |
| WO | WO-2020153955 A1 * | 7/2020 | ......... | G01N 15/0656 |

* cited by examiner

*Primary Examiner* — Tung X Nguyen
(74) *Attorney, Agent, or Firm* — Foley & Lardner LLP

(57) ABSTRACT

A particle monitoring system may include a flow passage, a particle imager to image a targeted particle within the flow passage, electrodes supported proximate the flow passage, a power source connected to the electrodes and a controller to cause the power source to charge to electrodes so as to (1) apply an electric field balanced with respect to gravity so as to hold, levitate and rotate a targeted particle within the flow passage during imaging and (2) release the targeted particle following the imaging.

14 Claims, 7 Drawing Sheets

ROTATING LEVITATED PARTICLE IMAGING

BACKGROUND

Particles are sometimes imaged to identify the particles or characteristics of the particles. For example, cellular structures such as cells, 3D cultures and organoids may serve as a key to understanding cellular mechanisms and processes. Such cellular structures are sometimes modeled or reconstructed to facilitate further study of such cellular structures.

Figure 1:
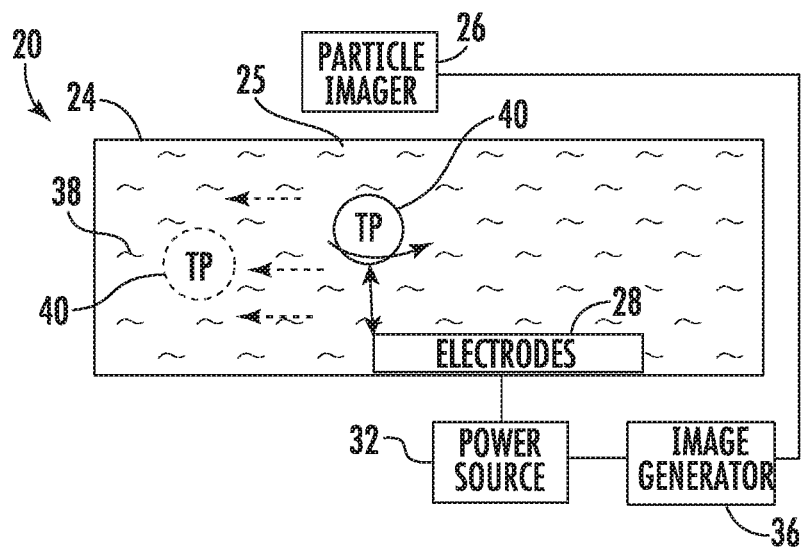
FIG. 1 is a sectional view schematically illustrating portions of an example particle imaging system.

Throughout the drawings, identical reference numbers designate similar, but not necessarily identical, elements. The Figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example particle imaging systems, methods and machine-readable mediums that facilitate the imaging of particles such as biological and non-biological particles. The example particle imaging systems, methods and machine-readable mediums may be well-suited to the imaging of biological particles in the form of cellular structures such as cells, 3D cultures and organoids. The example particle imaging systems, methods and machine readable mediums facilitate the construction of 3D images of the particles to facilitate identification of further study of the particles.

The example particle imaging systems, methods and machine-readable mediums utilize electrodes to apply an electric field that levitate and rotates a suspended particle while the particle is imaged. The example particle imaging systems, methods and machine-readable mediums control the electric field so as to balance the electric field with respect to gravity, holding, levitating and rotating a targeted particle within a flow passage during imaging. Because the targeted particle is levitated, held out of contact with respect to the electrodes and internal surfaces of flow passage, the targeted particle does not collide with or adhere to the electrodes or the interior surfaces of the flow passage during imaging, enhancing the imaging of the targeted particle. Following such imaging, the applied electric field is terminated or is adjusted to release the targeted particle. In some implementations, non-targeted particles are not held by the applied electric field, allowing the targeted particles, under the influence of gravity, fall away from the held targeted particles and to flow past and away from the targeted particles. As a result, the non-targeted particles are less likely to interfere with or obstruct the imaging of the targeted particles.

In some implementations, the flow passage through which particles, suspended in fluid, flow has a floor and a ceiling. The electrodes are charged so supplying an electric field that holds, levitate and rotates a targeted particle within the first zone spaced from in between the floor and the ceiling. At the same time, the applied electric field allows non-targeted particles to flow past the targeted particle through a second zone between the floor and the ceiling.

In one implementation, the first zone is above the second zone. Because the first zone is above the second zone, gravity assists in moving non-targeted particles to the second zone. In one implementation, the electrodes are above the first zone, wherein the applied electric field attracts the targeted particle towards the electrodes, but holds and levitates the targeted particle at location spaced from the electrodes in the ceiling of the flow passage. In another implementation, electrodes are below the first zone and the second zone, wherein the applied electric field repels the targeted particle away from the electrodes, but holds and levitates the targeted particle at a location spaced from the ceiling of the flow passage.

In some implementations, a fluid stream is provided in the flow passage. In such implementations, the applied electric field is sufficient to retain the targeted particle in the first zone while the non-targeted particles are carried away by the fluid stream, through the second zone. In some implementations, after the non-targeted particles are carried away or separated from the targeted particle being levitated and held by the applied electric field, an additional fluid stream containing a stimulant for the targeted particle may be directed through the flow passage. The stimulant, such as an anti-body or other stimulant, comes into contact with the targeted particle, wherein the effect of the stimulant upon the targeted particle may be evaluated through the continued imaging of the targeted particle as it is being held, levitated and rotated. In some implementations, multiple additional stimulant streams may be sequentially directed to the flow passage to facilitate imaging and analysis of such sequential simulation of the targeted particle.

In some implementations, the imaging and analysis of a targeted particle may lead to classification and/or identification of the targeted particle. In some implementations, the classified and/or identified particle may be controllably deposited in a predefined assigned location, such as in a particular well of the multi well plate. As a result, the identified and/or classified particle may be stored for subsequent location, retrieval and analysis.

Disclosed is an example particle monitoring system that may include a flow passage, a particle imager to image a targeted particle within the flow passage, electrodes supported proximate the flow passage, a power source connected to the electrodes and a controller to cause the power source to charge the electrodes so as to (1) apply an electric field balanced with respect to gravity so as to hold, levitate and rotate a targeted particle within the flow passage during imaging and (2) release the targeted particle following the imaging.

Disclosed is an example particle imaging method. The method may comprise supplying fluid containing a targeted particle and a non-targeted particle to a flow passage having a floor and a ceiling. Electrodes are used to apply an electric field balanced with respect to gravity so as to hold, levitate and rotate the targeted particle in a first zone between and spaced from the floor and the ceiling and while permitting the non-targeted particle to flow past the targeted particle through a second zone different from the first zone between the floor and the ceiling. While the targeted particle is being held, levitated and rotated by the electric field, the targeted particle is imaged by particle imager.

Disclosed is an example non-transitory machine-readable medium containing instructions. The instructions comprise particle levitation instructions and imaging instructions. The particle levitation instructions direct a processor to output control signals such that an electric field is applied to a fluid stream containing a targeted particle and a non-targeted particle, the electric field being balanced with respect to gravity so as to hold, levitate and rotate the targeted particle in a first zone while permitting the non-targeted particle to flow past the targeted particle in a second zone. The imaging instructions direct the processor to output control signals to image the targeted particle being rotated within the first zone by the applied electric field.

FIG. 1 is a sectional view schematically illustrating portions of an example particle imaging system 20. Imaging system 20 may be well-suited to the imaging of biological particles in the form of cellular structures such as cells, 3D cultures and organoid. Imaging system 20 facilitates the construction of 3D volumetric images of the particles to facilitate identification or further study of the particles.

Imaging system 20 applies a controlled electric field that is balanced with respect to gravity, holding, levitating and rotating a targeted particle within a flow passage during imaging. Because the targeted particle is levitated, held out of contact with respect to the electrodes and internal surfaces of flow passage, the targeted particle does not collide with or adhere to the electrodes or the interior surfaces of the flow passage during imaging, enhancing the imaging of the targeted particle. Following such imaging, the applied electric field is terminated or is adjusted to release the targeted particle. Some implementations, non-targeted particles are not held by the applied electric field, allowing the targeted particles, under the influence of gravity, fall away from the held targeted particles and to flow past and away from the targeted particles. As a result, the non-targeted particles are less likely to interfere with or obstruct the imaging of the targeted particles. Imaging system 20 comprises flow passage 24, particle imager 26, electrodes 28, power source 32 and image generator 36.

Flow passage 24 comprises a chamber, channel or other container to contain a fluid 38 in which a targeted particle (TP) 40 is carried or suspended. The targeted particle 40 may be a biological or non-biological particle. Examples of a biological particle includes a cell, 3D culture or organoid. Portions of the walls forming flow passage 24 may be transparent to facilitate the imaging of targeted particle 40 through such walls by particle imager 26. In some implementations, the transparent portions of the walls forming flow passage 24 may be in the form of a transparent lens that further facilitate such imaging of targeted particle 40.

Particle imager 26 comprises an optical sensor, such as a camera, with associated imaging optics. In one implementation, particle imager 26 comprises a CMOS array or a charge coupled device (CCD) device. Particle imager 26 output signals representing the captured images of targeted particle 40 to image generator 36. In the example illustrated, particle imager 26 is illustrated as being located vertically above flow passage 24, generally opposite to a transparent portion 25 of flow passage 24. In other implementations, particle imager 26 may be located to a side or below flow passage 24.

Electrodes 28 comprise electrically conductive terminals sufficiently proximate to flow passage 24 and connected to or connectable to a source of electrical power, power source 32. As will be described hereafter, electrodes 28 receive power from powers source 32 at a voltage and frequency such that electrodes 28 apply an electric field to the targeted particle 40 within flow passage 24.

Power source 32 comprises a source of electrical power connected to electrodes 28. Power source 32 may comprise an AC power source under the control of image generator 36.

Image generator 36 comprises a processing unit and a non-transitory machine-readable medium. The non-transitory machine-readable medium (also sometimes referred to as a computer-readable medium) contains instructions for directing the processing unit or processor to carry out the levitation of targeted particle 40 and the imaging of targeted particle 40. In particular, image generator 36 causes power source 32 to electrically charge electrodes 28 so as to apply an electric field that is balanced with respect to gravity. The electric field holds, levitates and rotates the targeted particle 40 within the flow passage 24 during imaging by particle imager 26. In one implementation, the applied electric field is a non-uniform non-rotating electric field that both levitates and rotates and targeted particle 40. In one implementation, electrodes 28 provide electro-kinetic rotation. In one implementation, the applied electric field is an alternating current (AC) that repels and rotates targeted particle 40, lifting the targeted particle 40 against the force of gravity, but out of contact with both the floor and the ceiling of flow passage 24 as well as electrodes 28.

Although electrodes 28 are illustrated as being located proximate a floor of flow passage 24, in other implementations, electrodes 28 are positioned proximate a ceiling of flow passage 28, wherein electrodes 28 apply an electric field that is a non-uniform non-rotating electric field that both levitates and rotates the targeted particle while attracting the targeted particle against the force of gravity to levitate and rotates the targeted particle 40 out of contact with both the floor and ceiling of flow passage 24 as well as electrodes 28.

In one implementation, the nonrotating nonuniform electric field is an alternating current electric field having a frequency of at least 650 kHz and no greater than 300 kHz. In one implementation, the nonrotating nonuniform electric field has a voltage of at least 0.1 V rms and no greater than 100 V rms. Between taking consecutive images with sensor 32, the particle may be rotated a distance that at least equals to the diffraction limit dlim of the imaging optics, such as diffraction element 36. The relationship between minimum rotating angle θ min, radius r and diffraction limit distance dlim is θ min=dlim/r. For example, for imaging with light of $\lambda$=500 nm and a diffraction element 36 of 0.5 numerical aperture (NA), the diffraction limit dlim=$\lambda$/(2NA)=500 nm. In the meanwhile, the particle 40 may not rotate too much that there is no overlap between consecutive image frames. In one implementation, the maximum rotating angle between consecutive images θ max=180−θ min. In one implementation, the nonuniform nonrotating electric field produces a dielectrophoretic torque on the particle so as to rotate the particle at a speed such that the optical sensor 32 may capture images every 2.4 degrees while producing output in a reasonably timely manner. In one implementation where the capture speed of the optical sensor 32 is 30 frames per second, the produced dielectrophoretic torque rotates the particle at a rotational speed of at least 12 rpm and no greater than 180 rpm. In one implementation, the produced dielectrophoretic torque rotates the particle at least one pixel shift between adjacent frames, but where the picture shift is not so great so as to not be captured by the optical sensor. In other implementations, particle 40 may be rotated at other rotational speeds.

Image generator 36 further controls particle imager 26 so as to capture images of the levitated and rotating targeted particle 40. The signals or images received from particle imager 26 are used by image generator 36 to construct an image, such as a three-dimensional volumetric image, of the targeted particle 40. One example of how image generator 36 may construct an image of targeted particle 40 is described hereafter with respect to FIGS. 7-12. Following such imaging of targeted particle 40, image generator 36 terminates or adjusts the electric field being applied by power source 32 so as to release the targeted particle 40. As indicated by broken lines, release of targeted particle 40 allows targeted particle 40 to be carried away by the fluid flow within flow passage 24. Thereafter, a new targeted particle 40 may be positioned and held for imaging.

Figure 2:
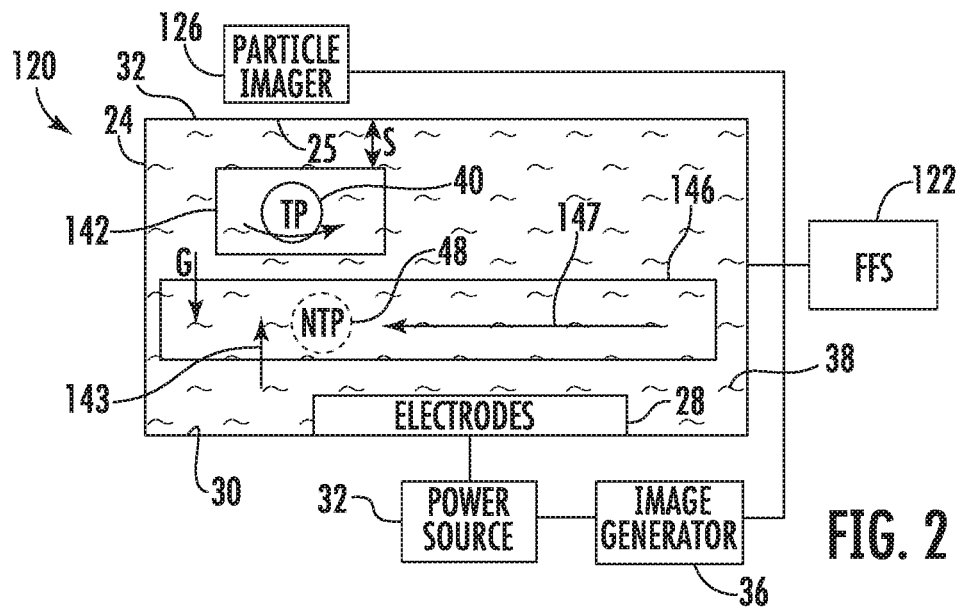
FIG. 2 is a sectional view schematically illustrating portions of an example particle imaging system.

FIG. 2 is a sectional view schematically illustrating portions of an example particle imaging system 120 particle imaging system 120 is similar to particle imaging system 20 described above except that particle imaging system 120 comprises fluid flow source 122 and specifically comprises particle imager 126, wherein image generator 36 follows instructions that specifically direct the power source 32 to cause the electrodes 28 to apply a non-uniform non-rotating electric field at a particular frequency and voltage such that the targeted particle 40 is held, levitated and rotated within a first zone 142 between the floor 30 in the ceiling 32 of flow passage 24. As indicated by arrow 143, image generator 36 outputs control signals to power source 32 such that electrodes 28 apply an electric field that repels targeted particle 40 towards ceiling 22 against the force of gravity G, balanced with respect to the force of gravity G, such that the targeted particle 40 is held within zone 142. Those remaining components of system 120 which correspond to system 20 are numbered similarly.

Fluid flow source 122 provides a fluid stream in flow passage 24, wherein the applied electric field is sufficient to retain the targeted particle 40 in the first zone 142 while the non-targeted particle 48 is carried away by the fluid stream through zone 142 as indicated by arrow 147.

Zone 142 comprises a vertical region in which the targeted particle 40 is held as it is being rotated or levitated by the field produced by electrodes 28. Particle 140 is held vertically within the zone 142 which is spaced below ceiling 32 and is spaced above floor 30 in electrodes 28. Zone 142 is further spaced above a second zone 146 that is sandwiched between zone 142 and floor 30 or electrodes 28. In one implementation, zone 142 has a vertical height of at least 10 um and no greater than 100 um. In one implementation, zone 142 is spaced from the ceiling 32 of float passage 24 by a gap spacing S of at least 100 nm and no greater than 5 um. This spacing facilitates enhanced imaging of the targeted particle 40 while allowing sufficient vertical space for zone 146.

Zone 146 is sandwiched between zone 142 and floor 30 or electrodes 28. Zone 146 provides a vertical region through which nontargeted particles, such as nontargeted particle (NTP) 148 may pass below and past targeted particle 40 as indicated by arrow 147. As a result, nontargeted particle 48, not held by the electric field produced by electrodes 28, may continue downstream within flow passage 24 without instructor interfering with the imaging of the targeted particle 40. Although illustrated as extending above floor 30 electrodes 28, it should be appreciated that zone 146 may extend from the lower boundary of zone 142 to floor 30. In one implementation, the upper boundary of zone 146 also comprises a lower boundary of zone 142. In one implementation, zone 146 has a vertical height of at least 10 um. In other implementations, zone 146 may have other vertical heights sufficient for the passage of nontargeted particles below targeted particle 40.

Particle imager 126 is similar to particle imager 26 described above except that particle imager 126 comprises imaging optics that provide particle imager 126 with a depth of focus that includes zone 142 but excludes zone 146. Because the depth of focus of particle imager 26 includes zone 142, but excludes zone 146, the imager is focused on zone 142. At the same time, the depth of focus of imager 126 is not deep enough to cover zone 146. As a result, any nontargeted particles within zone 146 may be very blurry in the images such that they may be easily disregarded and such that the nontargeted particles within zone 146 do not obstruct or interfere with the imaging of targeted particle 40 in zone 142.

Figure 3:
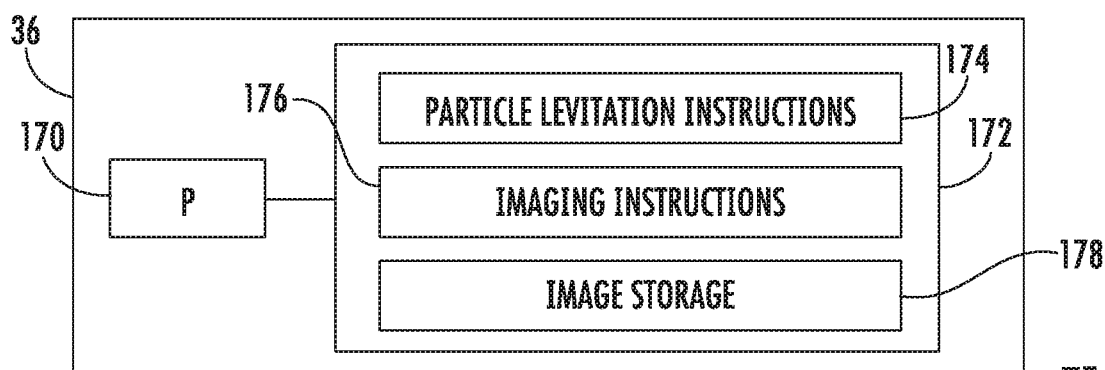
FIG. 3 is a block diagram illustrating portions of an example image generator.

FIG. 3 is a block diagram illustrating an example image generator 36. As shown by FIG. 3, image generator 36 comprises processor 170 and non-transitory machine-readable medium 172. Processor 170 carries out instructions provided or stored in medium 172. Medium 172 comprises particle levitation instructions 174, imaging instructions 176 and image storage 178.

Particle levitation instructions 174 comprise logic, programming, software or code that directs power source 32 to apply electrical power to electrodes 28 so as to form a non-rotating non-uniform electric field that holds, levitates and rotates a targeted particle, such as target particle 40. Instructions 174 cause the processor 170 to output control signals which are transmitted to power source 32. In response, power source 32 outputs an AC at a frequency and voltage to the electrodes that apply repulsive force that is balanced with respect to the force of gravity G so as to levitate the particle at a height elevated above electrodes 28 and floor 30 and spaced below ceiling 32 of flow passage 24. The frequency and voltage further produce a dielectrophoretic torque that rotates the levitating target particle 40.

In one implementation, the nonrotating nonuniform electric field is an alternating current electric field having a frequency of at least 30 kHz and no greater than 500 kHz. In one implementation, the nonrotating nonuniform electric field has a voltage of at least 0.1 V rms and no greater than 100 V rms. Between taking consecutive images with sensor 32, the particle may be rotated a distance that at least equals to the diffraction limit dlim of the imaging optics, such as diffraction element 36. The relationship between minimum rotating angle θ min, radius r and diffraction limit distance dlim is θ min=dlim/r. For example, for imaging with light of λ=500 nm and a diffraction element 36 of 0.5 numerical aperture (NA), the diffraction limit dlim=λ/(2NA)=500 nm. In the meanwhile, the particle 40 may not rotate too much that there is no overlap between consecutive image frames. In one implementation, the maximum rotating angle between consecutive images θ max=180−θ min. In one implementation, the nonuniform nonrotating electric field produces a dielectrophoretic torque on the particle so as to rotate the particle at a speed such that the optical sensor 32 may capture images every 2.4 degrees while producing output in a reasonably timely manner. In one implementation where the capture speed of the optical sensor 32 is 30 frames per second, the produced dielectrophoretic torque rotates the particle at a rotational speed of at least 12 rpm and no greater than 180 rpm. In one implementation, the produced dielectrophoretic torque rotates the particle at least one pixel shift between adjacent frames, but where the picture shift is not so great so as to not be captured by the optical sensor. In other implementations, particle 40 may be rotated at other rotational speeds.

Imaging instructions 176 comprise logic, programming, software code that directs processor 170 to output control signals causing the capture of images by particle imager 126. Imaging instructions 176 further direct processor 172 analyze the captured images into produce a 3D volumetric image of the targeted particle using the images. In one implementation, the individual images captured at different points of rotation of the targeted particle 40 as well as the generated three-dimensional volumetric image may be stored in an image storage 178 of medium 172 for subsequent retrieval and analysis.

Figure 4:
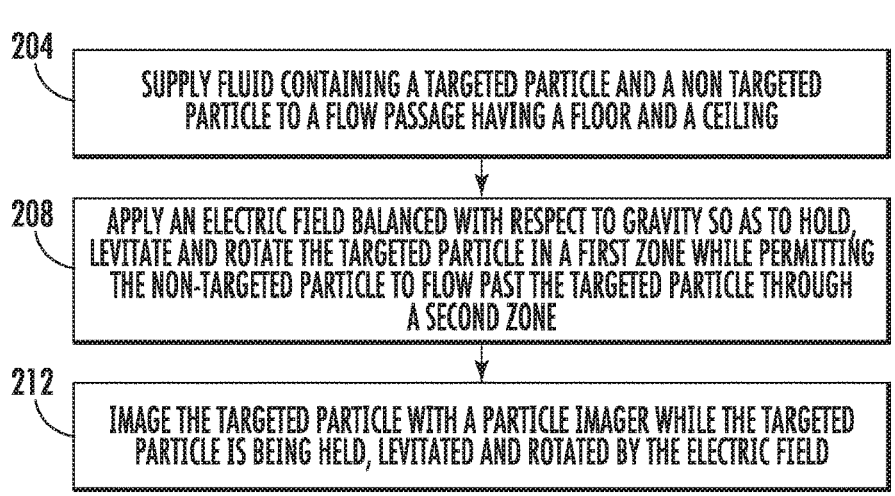
FIG. 4 is a flow diagram of an example particle imaging method.

FIG. 4 is a flow diagram of an example particle imaging method 200. Method 200 may be well-suited to the imaging of biological particles in the form of cellular structures such as cells, 3D cultures and organoids. The example particle imaging systems, methods and machine readable mediums facilitate the construction of 3D images of the particles to facilitate identification of further study of the particles.

Method 200 utilize electrodes to apply an electric field that levitate and rotates a suspended particle while the particle is imaged. Method 200 controls the electric field so as to balance the electric field with respect to gravity, holding, levitating and rotating a targeted particle within a flow passage during imaging. Because the targeted particle is levitated, held out of contact with respect to the electrodes and internal surfaces of flow passage, the targeted particle does not collide with or adhere to the electrodes or the interior surfaces of the flow passage during imaging, enhancing the imaging of the targeted particle. Following such imaging, the applied electric field is terminated or is adjusted to release the targeted particle. Although method 200 is described in the context of being carried out by system 120 described above, it should be appreciated that method 200 may likewise be carried out with any of the other systems described in the present disclosure or with other similar particle imaging systems.

As indicated by block 204, a fluid 38 containing the targeted particle 40 and non-targeted particle 48 is supplied to flow passage 24 having a floor 30 and ceiling 32.

As indicated by block 208, an electric field balanced with respect to gravity is applied by electrodes 28 so as to hold, levitate and rotate the targeted particle in a first zone 142. The first zone is between the floor 30 and the ceiling 32. The first zone 142 is spaced from the floor and the ceiling. The zone is sized so as to permit the non-targeted particle 48 to flow past the targeted particle 40 through the second zone 146.

As indicated by block 212, the targeted particle is imaged with a particle imager while the targeted particle is being held, levitating rotated by the electric field. In some implementations, different images of the targeted particle may be captured at different points during the rotation of the targeted particle 40. The different images at the different angles facilitate the generation of a three-dimensional volumetric image of the targeted particle 40. Captured images may be forwarded to other computing devices for processing and/or may be stored for subsequent retrieval.

Figure 5:
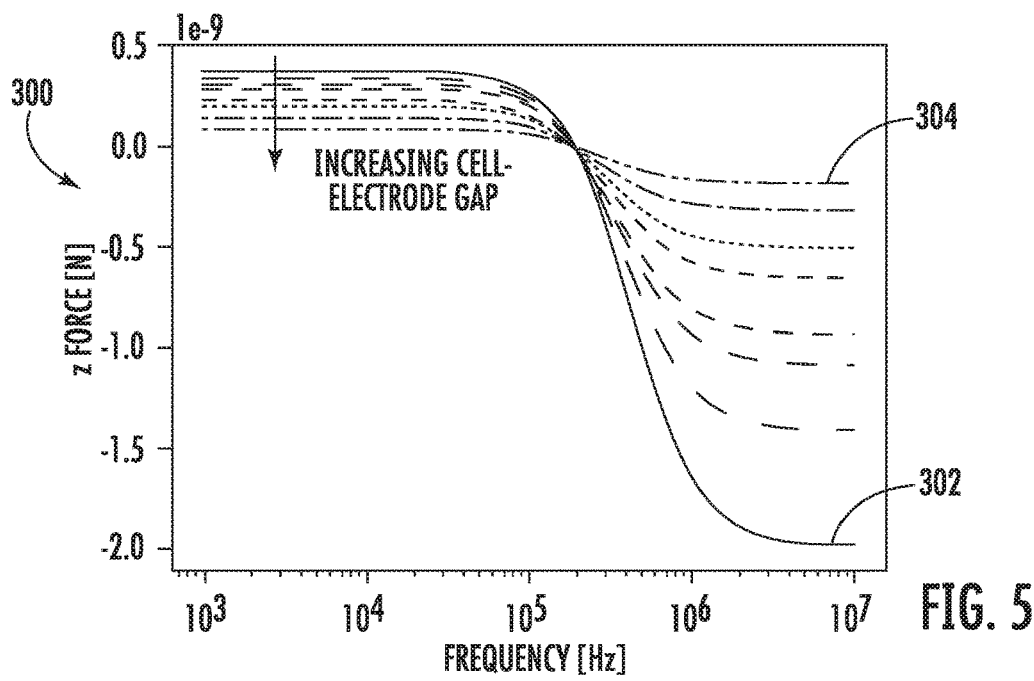
FIG. 5 is a diagram illustrating one example relationship between the frequency of AC current applied to electrodes and the resulting levitating force of the electrodes.

FIG. 5 is a graph 300 illustrating one example relationship between the amount of vertical force applied by the electrodes to a targeted particle as a function of the frequency of the alternating current supplied to the electrodes 28. In the example illustrated, line 302 represents the largest spacing between the targeted particle and the electrodes while lying 304 represents the smallest spacing between the targeted particle and the electrodes. The diagram omits the impact of gravity. As shown by FIG. 5, AC frequencies generally below $10^5$ Hz create a repulsive force repelling the targeted particle away from the electrodes. AC frequencies generally above $10^5$ Hz create an attractive force drawing the targeted particle towards the electrodes. Image generator 36 utilizes relationship to apply a particular frequency that repels the targeted particle 40 away from the electrodes against the force of gravity so as to lift and elevate the targeted particle 40 into zone 142. The exact AC frequency applied in the particular amount of force to levitate the targeted particle 40 within zone 142 may vary depending upon the voltage being applied, the characteristics of the targeted particle, the characteristics of the fluid 38 and other factors.

Figure 6:
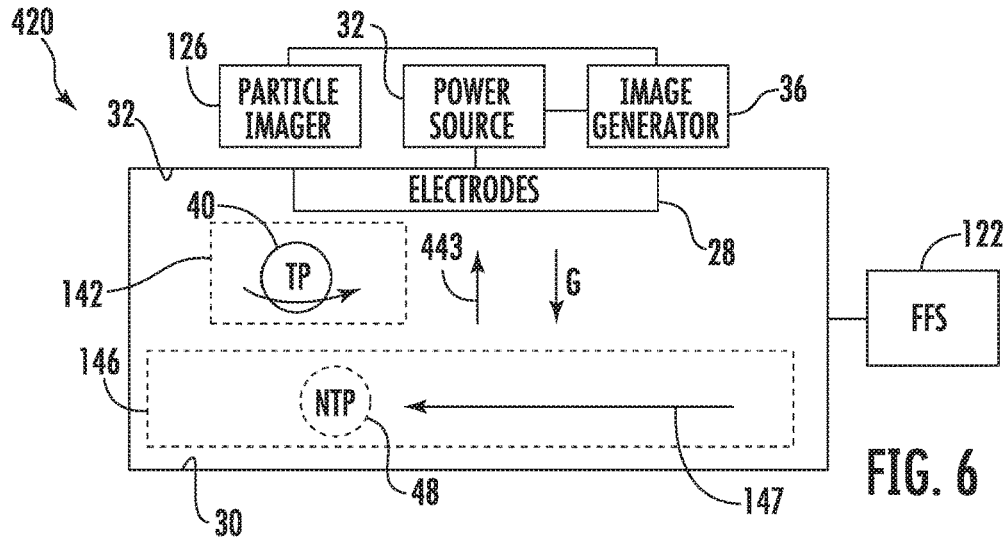
FIG. 6 is a sectional view schematically illustrating portions of an example image generator.

As further shown by FIG. 5, certain AC frequencies may be applied to the electrodes such that the electrodes provide an attracting force to the targeted particle. FIG. 6 is a sectional view schematically illustrating portions of an example particle imaging system 420 that applies electrical power to the electrodes at a voltage and frequency so as to attract the targeted particle against the force of gravity for levitation in zone 142. Because the targeted particle is attracted or raised towards the electrodes 28 inches on 142, the targeted particle 40 is less likely to adhere to portions near the floor or bottom of flow passage 24 upon startup (as compared to system 120 where the electrodes repel the targeted particle 40 zone 142). In the example illustrated, particle imaging system 420 is similar to particle imaging system 120 except that electrodes 28 are located proximate to ceiling 32 rather than floor 30. Those remaining components of system 420 which correspond to components of system 120 are numbered similarly.

As shown by FIG. 6, image generator 36 directs power source 32 to electrically power the electrodes 28 with an AC frequency and voltage that produces an attractive force (represented by arrow 443) (z-force in FIG. 5) that is balanced with respect to the force of gravity G so as to hold and retain the targeted particle 40 within zone 142 as it is being rotated by the nonuniform nonrotating electric field. At the same time, nontargeted particle 48 is not attracted by the field produced by electrodes 28 such that nontargeted particle 48 may flow past 142 and past targeted particle 40 as indicated by arrow 147. As described above with respect to system 120, because nontargeted particle 48 is not attracted towards electrode 28, nontargeted part 48 falls into zone 146 and out of the depth of focus of particle imager 126 where it is less likely to obstruct or interfere with the imaging of targeted particle 40.

In one implementation, the targeted particle 40 and the nontargeted particle 48 may have different electrical properties causing the targeted particle to be attracted towards the electrodes 28 with a first force and the nontargeted particle 48 to not be attracted to electrodes 28 or to be attracted electrodes 28 with a second lesser force given the properties of the electric field produced by the electrically charged electrodes 28. In one implementation, the targeted particle 40 and nontargeted particle 48 may, without alteration, have the different dielectrophoretic properties that cause a different degrees of attraction (or repulsion, depending upon the applied frequency, in some implementations) with respect to the charged electrodes 28. In other implementations, the targeted particle 40 and the nontargeted particle 48 may be differently stained, tagged or altered so as to have different conductive or dielectrophoretic properties such that the applied electric field produces a greater attractive force (or repulsive force in some implementations) with respect to the targeted particle 40 as compared to the nontargeted particle 48.

Figure 7:
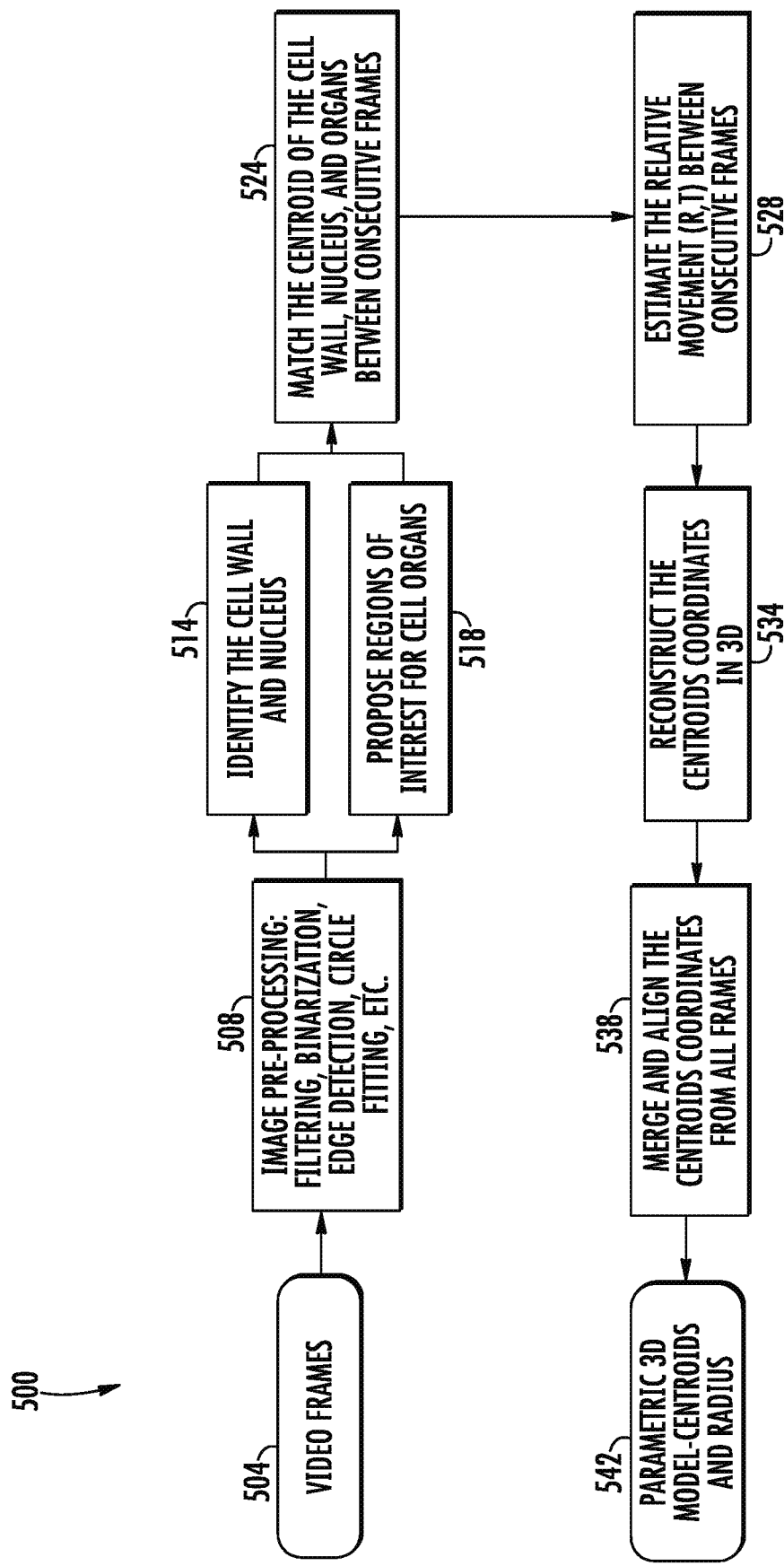
FIG. 7 is a flow diagram of an example three-dimensional volume imaging method.

FIGS. 7-12 illustrate one example process by which the 3D volumetric image may be generated based upon a combination of the brightfield image representing the morphological information in the spectral image(s) identifying different internal structures of the particle or cell by color. FIG. 7 is a flow diagram of an example three-dimensional volumetric modeling method 500. Method 500 may be carried out by any of the image generators of this disclosure or similar image generators to produce 3D volumetric images of a particle, such as a cell. As indicated by block 504, a controller, such as image generator 36, receives video frames or two-dimensional images captured by the imager/camera 60 during rotation of particle 40. As indicated by block 508, various preprocessing actions are taken with respect to each of the received two-dimensional image video frames. Such preprocessing may include filtering, binarization, edge detection, circle fitting and the like.

As indicated by block 514, utilizing such edge detection, circle fitting and the like, image generator 36 retrieves and consults a predefined three-dimensional volumetric template of the particle 40, to identify various internal structures of the particle are various internal points in the particle. The three-dimensional volumetric template may identify the shape, size and general expected position of internal structures which may then be matched to those of the two-dimensional images taken at the different angles. For example, a single cell may have a three-dimensional volumetric template comprising a sphere having a centroid and a radius. The three-dimensional location of the centroid and radius are determined by analyzing multiple two-dimensional images taken at different angles.

Based upon a centroid and radius of the biological particle or cell, image generator 36 may model in three-dimensional space the size and internal depth/location of internal structures, such as the nucleus and organelles. For example, with respect to cells, image generator 36 may utilize a predefined template of a cell in the spectral information from the spectral image to identify the cell wall and the nucleus. As indicated by block 518, using a predefined template in the spectral image(s), image generator 36 additionally identifies regions or points of interest, such as organs or organelles of the cell. As indicated by block 524, image generator 36 matches the centroid of the cell membrane, nucleus and organelles amongst or between the consecutive frames so as to estimate the relative movement (R, T) between the consecutive frames per block 528.

As indicated by block 534, based upon the estimated relative movement between consecutive frames, image generator 36 reconstructs the centroid coordinates in three-dimensional space. As indicated by block 538, the centroid three-dimensional coordinates reconstructed from every two frames are merged and aligned. A single copy of the same organelle is preserved. As indicated by block 542, image generator 36 outputs a three-dimensional volumetric parametric model of particle 40.

FIGS. 8-12 illustrate one example modeling process 600 that may be utilized by image generator 36 in the three-dimensional volumetric modeling of the biological particle or cell. FIGS. 8-12 illustrate an example three-dimensional volumetric modeling of an individual cell. As should be appreciated, the modeling process depicted in FIGS. 8-12 may likewise be carried out with other particles.

Figure 8:
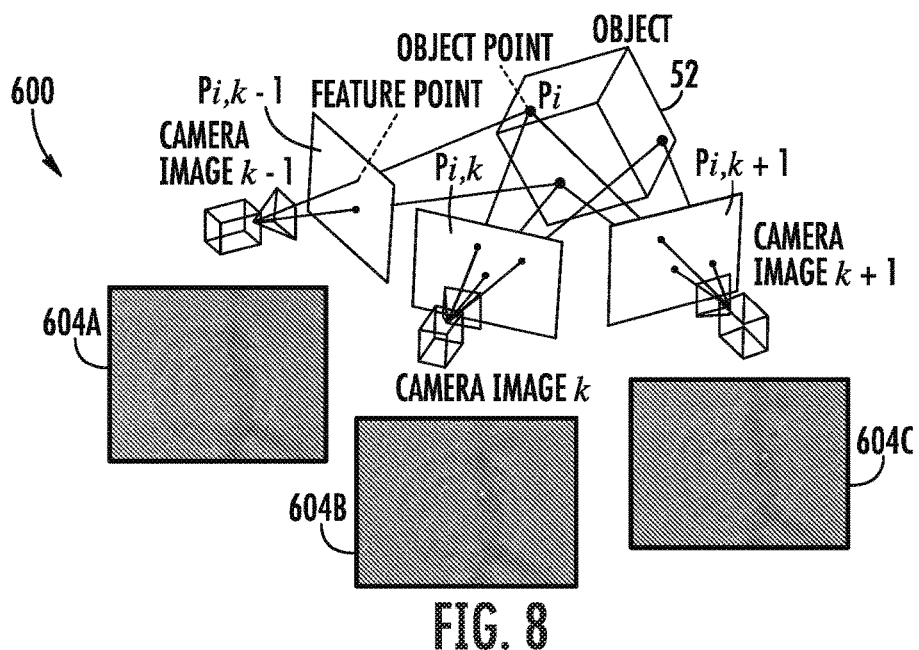
FIG. 8 is a diagram schematically illustrating capture of two-dimensional image frames of a rotating particle at different angles.

As shown by FIG. 8, two-dimensional video/camera images or frames 604A, 604B and 604C (collectively referred to as frame 604) of the biological particle 40 (schematically illustrated) are captured at different angles during rotation of particle 40. In one implementation, the frame rate of the imager or camera is chosen such as the particle is to rotate no more than 5° per frame by no less than 0.1°. In one implementation, a single camera captures each of the three frames during rotation of particle 40 (schematically illustrated with three instances of the same camera at different angular positions about particle 40) in other implementations, multiple cameras may be utilized.

Figure 9:
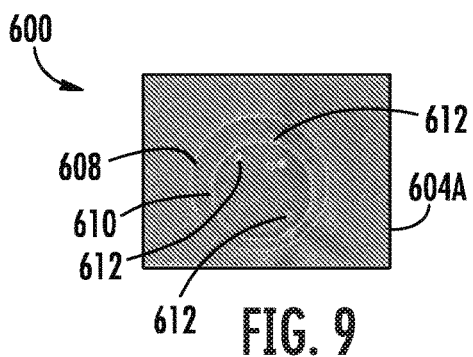
FIG. 9 is a diagram depicting an example image frame including the identification of features of a particle at a first angular position.
Figure 10:
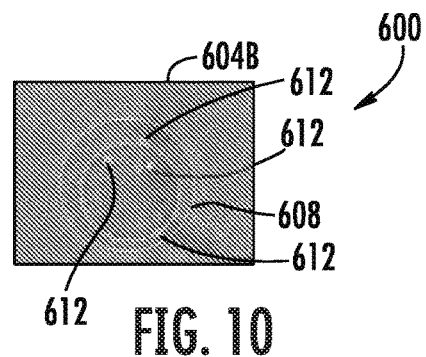
FIG. 10 is a diagram depicting an example image frame including the identifications of the features of the particle at a second different angular position.

As shown by FIGS. 9 and 10, after image preprocessing set forth in block 508 in FIG. 7, edge detection, circle fitting another feature detection techniques are utilized to distinguish between distinct structures on the surface and within particle 40, wherein the structures are further identified through the use of a predefined template for the particle 40. For the example cell, image generator 36 identifies wall 608, its nucleus 610 and internal points of interest, such as cell organs or organelles 612 in each of the frames (two of which are shown by FIGS. 9 and 10).

Figure 11:
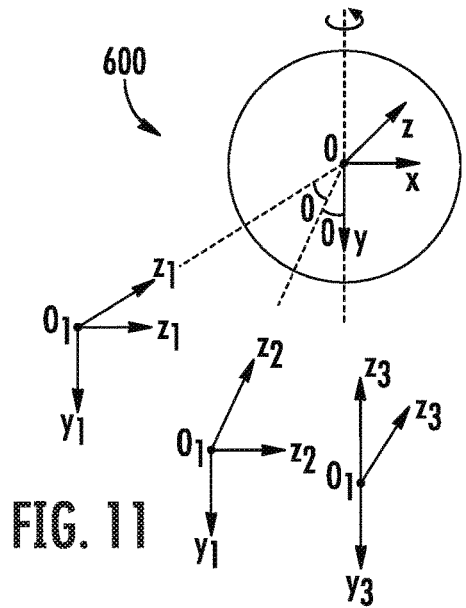
FIG. 11 is a diagram illustrating triangulation of the different identified features for the merging and alignment of features from the frames.

As shown by FIG. 11 and as described above with respect to blocks 524-538, image generator 36 matches a centroid of a cell membrane, nucleus and organelles between consecutive frames, such as between frame 604A and 604B. Image generator 36 further estimates a relative movement between the consecutive frames, reconstructs a centroid's coordinates in three-dimensional space and then utilizes the reconstructed centroid coordinates to merge and align the centroid coordinates from all of the frames. The relationship for the relative movement parameters R and T is derived assuming that the rotation axis is kept still and the speed is constant all the time. Then, just the rotation speed is utilized to determine R and T ($\overrightarrow{O_1 O_2}$), as shown in FIG. 11, where:

$$\overrightarrow{O_1O_2} = \overrightarrow{OO_1} \cdot R_\theta - \overrightarrow{OO_1}; R_\theta = R_y(\theta) = \begin{bmatrix} \cos\theta & 0 & \sin\theta \\ 0 & 1 & 1 \\ -\sin\theta & 1 & \cos\theta \end{bmatrix}$$

based on the following assumptions:

θ is constant;

$|\overrightarrow{OO_1}|=|\overrightarrow{OO_2}|=|\overrightarrow{OO_3}|=\ldots$;

rotation axis doesn't change (along y axis); and $\overrightarrow{OO_1}$ is known.

Figure 12:
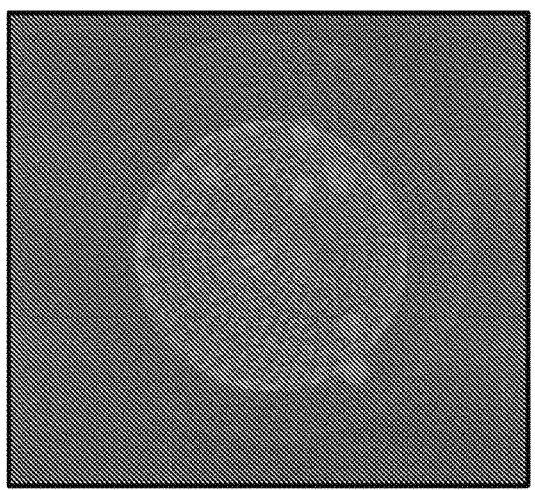
FIG. 12 is a diagram illustrating an example three-dimensional volumetric parametric model produced from the example image frames including those of FIGS. 9 and 10.

As shown by FIG. 12, the above reconstruction by image generator 36 results in the output of a parametric three-dimensional volumetric model of the particle 40, shown as a cell.

Figure 13:
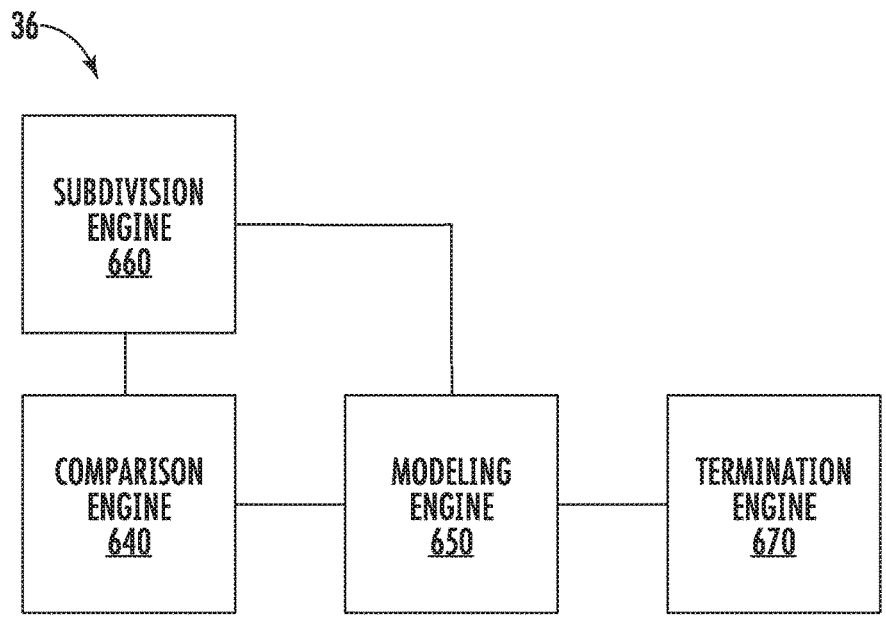
FIG. 13 is a block diagram illustrating portions of an example image generator for generating an example three-dimensional volumetric model.

In other implementations, the generation of the three-dimensional volumetric model of the particle 40 may be carried out using other methods. FIG. 13 is a block diagram of portions of image generator 36 for generating a three-dimensional volumetric model or image of particle 40. Image generator 36 may generate the three-dimensional volumetric model or image of particle 40 as described below rather than carrying out method 500 described above described with respect to FIGS. 7-12. In such an implementation, image generator 36 may comprise comparison engines 640, modeling engine 650, subdivision engine 660 and termination engine 670. The comparison engine 640 may determine a spatial relationship between the particle imager 26 and the particle for each image. The rate of rotation of the particle may be measured, may be calculated based on assumptions, may be set based on the choice of voltage or frequency or the like. The comparison engine 240 may determine how much the particle has rotated between images based on the rate of rotation and the frame rate (e.g., by dividing the rate of rotation by the frame rate). The comparison engine 640 may determine the spatial relationship from the frame of reference of the particle imager 26 (e.g., the amount of rotation of the particle) or from the frame of reference of the particle (e.g., the amount of revolution about the particle by the particle imager 26).

The comparison engine 640 may compare a projection of a model of the particle to a respective contour of the particle in each image. For example, for each image, the comparison engine 640 may backproject the model onto the image plane of that image. The comparison engine 640 may perform the backprojection at an orientation corresponding to the spatial relationship determined for that image. For example, the comparison engine 640 may rotate the model prior to projection, or the comparison engine 640 may choose a direction to backproject from the model based on the spatial relationship. The comparison engine 640 may extract the contour from each image. For example, a user may select an particle, and the comparison engine 640 may determine the contour for that particle (e.g., using computer visions techniques, machine learning, etc.). In some examples, the system 200 may generate models for multiple particles (e.g., a cell and a cell particles, multiple cell particles, multiple cells, or the like). The comparison engine 640 may extract the contours for the multiple particles and compare them to the corresponding models for each particle.

Modeling engine 650 may modify the model of the particle to more closely correspond to the respective contour of the particle in each image. In an example, the comparison engine 640 and the modeling engine 650 may modify the model iteratively to correspond to the particle as determined based on the contours. For example, the modeling engine 650 may initially form the model of the particle as a volume element (voxel). The voxel may be a three-dimensional solid, a polyhedron, a cube, or the like. The system 200 may include a subdivision engine 660. The subdivision engine 660 may subdivide the voxel into smaller voxels. For example, a cube may be subdivided into eight smaller cubes. In some examples, the voxel may be subdivided multiple times in each iteration (e.g., a cube subdivided into 8^2 (64), 8^3 (512) smaller cubes, or the like).

The comparison engine 640 may backproject the vertices of the voxels onto the image plane of an image for comparison with the contour for that image. The comparison engine 640 may determine for each of the subdivided voxels whether a contour lies within the projection of that subdivided voxel or whether a subdivided voxel is entirely inside or outside the contour. The modeling engine 650 may remove subdivided voxels to cause the model of the particle to more closely correspond to the particle (e.g., more closely correspond to the contour of the particle in each image). In an example, the modeling engine 650 may remove from the model a subdivided voxel that is entirely outside the contour in any image. A subdivided voxel that is entirely inside the contour in every image may correspond to an interior of the particle. The modeling engine 650 may remove from the model subdivided voxels that are entirely inside the contour in every image. Accordingly, the modified model may include a subset of the subdivided voxels that correspond to a boundary of the particle (e.g., subdivided voxels intersected by a contour but not entirely outside the particle).

Termination engine 670 may determine whether to perform an additional iteration or to terminate the iterative process. For example, the termination engine 670 may compare a smallest subdivided voxel to a resolution threshold to determine whether to perform an additional iteration. The resolution threshold may be user specified, may depend on the resolution attainable by the imaging device, may depend on an application or use for the model, or the like. Based on a determination to perform an additional iteration, the subdivision engine 660 may further subdivide the subdivided voxels remaining in the model. The comparison engine 640 may compare backprojections of the further subdivided voxels (e.g., a backprojection of the vertices) with the contours in each image. The modeling engine 670 may remove further subdivided voxels according to similar criteria as used for the subdivided voxels.

Additional iterations may be performed until the termination engine 670 determines not to perform an additional iteration, for example, based on a resolution threshold being reached, based on a predetermined number of iterations being performed, or the like. The termination engine 670 may output a final model after the final iteration. In an example, the termination engine 670 may generate the final model by generating a representation of a surface of the particle based on the model after final iteration. For example, the termination engine 670 may generate a mesh or solid by connecting vertices of the final voxels (e.g., vertices on an external side of the voxels of the model after the final iteration).

In some examples, the model may be modified non-iteratively to produce the final version. The subdivision engine 660 may subdivide the initial voxel until it has subdivided voxels below the resolution threshold, has subdivided a predetermined number of times, or the like. The comparison engine 640 and modeling engine 650 may operate as previously discussed to remove the subdivided voxels in a single iteration, and the result may be finalized or output. In an example, the comparison engine 640 and the modeling engine 650 may compare and modify the model without subdividing voxels. The modeling engine 650 may modify the shape of the model until the model matches the contour for that direction. For example, the comparison engine 640 may extend the contour into three dimensions in a direction of the normal vector of the image plane. The modeling engine 650 may modify the model (e.g., a surface of the model) so that any portions of the model outside the extended contour are modified to conform to the extended contour (e.g., by redefining the surface of the model). The comparison engine 640 and the modeling engine 650 may extend the contour and modify the model based on that contour for each image in the plurality to produce a result to be finalized or output.

Figure 14:
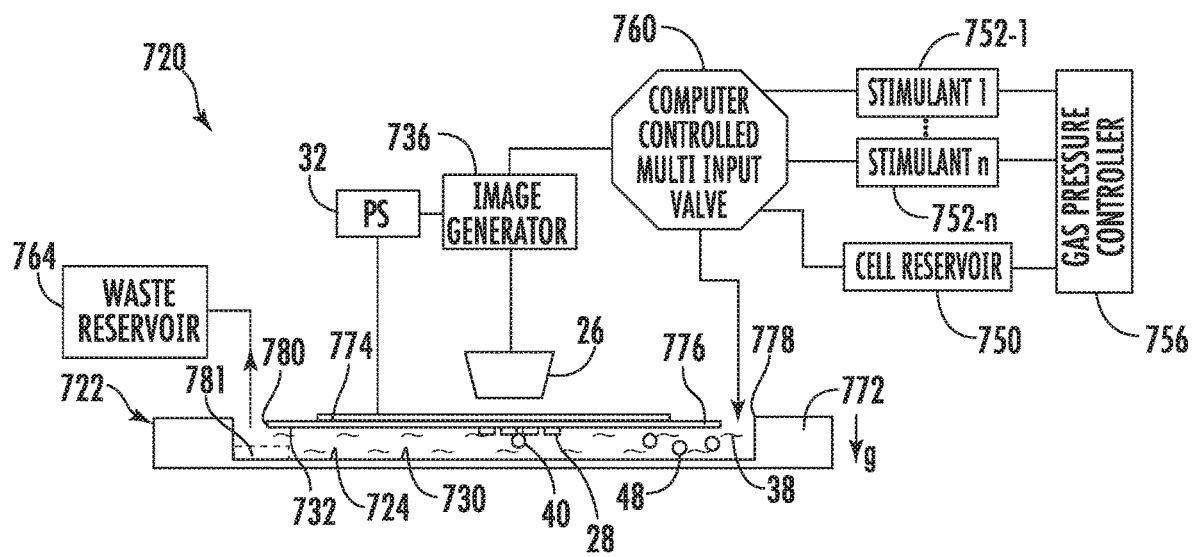
FIG. 14 is a sectional view schematically illustrating portions of an example particle imaging system.

FIG. 14 is a sectional view schematically illustrating portions of an example particle imaging system 720. Similar to particle imaging system 420, particle imaging system 720 applies an electric field that attracts, hold, levitate and rotates a targeted particle 40 within first zone that is spaced from in between both the ceiling/electrodes and the floor of the flow passage while permitting non-targeted particles to flow below and passed the targeted particle and a second zone. In addition, system 720 is constructed so as to facilitate the successive application of different stimulants to the targeted particle being retained by the electric field to further facilitate imaging of the effect of the stimulants upon the targeted particle as it is rotating. System 720 comprises microfluidic chip 722, particle imager 26, power source 32, particle or cell reservoir 750, stimulant reservoirs 752-1, 752-*n*, gas pressure controller 756, multi-input valve 760, waste reservoir 764 and image generator 736.

Microfluidic chip 722 (shown in section) comprises a layer or group of layers forming a microfluidic flow passage through which fluid is directed while being imaged. Microfluidic chip 722 may be formed by performing various microfabrication and/or micromachining processes on a substrate to form and/or connect structures and/or components. The substrate may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components that combine to form or define the microfluidic channel and/or chamber.

In some examples described herein, at least one dimension of a microfluidic flow passage may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels or passages may facilitate capillary pumping due to capillary force. In addition, examples may couple at least two microfluidic channels to a microfluidic output channel via a fluid junction.

In the example illustrated, microfluidic chip 722 comprises substrate 770, channel layer 772, resistor layer 774 and electrodes 28. Substrate 770 comprise a layer of layers upon which resistor layer 774 and electrodes 28 are formed. In the example illustrated in which particle imager 26 is located above chip 722, at least portions of substrate 770 are transparent to facilitate imaging of the targeted particle 40. In one implementation, substrate 770 may be formed from a glass or a transparent polymer.

Channel layer 772 at least partially forms flow passage 724 through chip 722. Flow passage 724 extends from an inlet port 778 to an outlet port 780. In the example illustrated, substrate layers 772 forms a floor 730 of flow passage 724 while substrate 770 forms a ceiling 732 of flow passage 724. In one implementation, channel layer 772 is formed from a photo resist epoxy such as SU8. In other implementations, channel layer 772 may be formed from other materials.

Resistor layer 774 comprises a layer having a temperature sensitive resistor to facilitate temperature control. Resistor layer 774 further supports electrodes 28 along a ceiling 732 of flow passage 724. In one implementation, resistor layer 774 comprises a transparent electrically conductive material such as indium tin oxide, facilitating imaging of the underlying target particle 40 being held and rotated by the electric field applied by electrodes 28. Electrodes 728 are connected to power source 32 so as to be independently and separately charged, under the control of image generator 736, those who forming nine uniform nine rotating electric field that holds, levitate and rotate the targeted particle 40 within an upper zone will nontargeted particles 48 are permitted to flow past the targeted particle 40 in a lower zone (adjacent floor 730).

Cell reservoir 750 comprises a reservoir of fluid 38 containing particles or cells for imaging and analysis. Cell reservoir 750 may contain both particles of interest, such as targeted particle 40 as well as other non-targeted particles 48.

Stimulant reservoirs 752-1-752-*n* (collectively referred to as reservoir 752) comprise chambers containing fluids that include different stimulants for targeted particles, such as targeted particle 40. Examples of such a stimulant may include different antibodies.

Gas pressure controller 756 controls the pressure of reservoirs 750, 752 to control the rate at which fluids of such reservoirs are directed into flow passage 724 by valve 760. In some implementations, gas pressure controller 756 may be omitted, wherein fluid pumps, such as inertial pumps, are provided in chip 722 to draw fluid from selected reservoirs 750, 752. Valve 760 comprises a multi-input valve which selectively directs fluid from a selected one of reservoirs 750, 752 through port 778 into flow passage 724. Valve 760 operates under the control of control signals output by image generator 736.

Waste reservoir 764 comprise the chamber reservoir connected to outlet port 780 and flow passage 724. Waste reservoir 764 receives the fluid in stimulants following the imaging of the targeted particle 40. Waste reservoir 764 further receives the non-targeted particles 48 that have passed the targeted particle 40 without being imaged. As shown in broken lines, in some implementations, chip 722 may additionally include a fluid actuator 781 which selectively eject fluid through port 780 into with reservoir 764. Waste reservoir may comprise a thermal resistor that outputs heat so as to vaporize adjacent fluid, creating a bubble that expels fluid through port 780. In other implementations, the fluid actuator may have other form such as piezo-membrane based actuators, electrostatic membrane actuators, mechanical/impact driven membrane actuators, magnetostrictive drive actuators, electrochemical actuators, other such microdevices, or any combination thereof. As will be described hereafter, in some implementations, waste reservoir 764 may be replaced with a fluid actuator that selectively ejects fluid in particular particles through outlet port 780 into an underlying multi well plate position by an actuator.

Image generator 736 controls the supply, imaging and stimulation of system 720. Image generator 736 is similar to image generator 36 described above in that image generator 736 may comprise particle levitation instructions 174, imaging instructions 176 and image storage 178 (described above). Image generator 726 may carry out method 200 to produce three-dimensional images of the particles or cells (as described above with respect to FIG. 7-12). In addition, image generator 736, serving as a controller, may include stimulation instructions in medium 172 (shown in FIG. 3) for directing a processor 170 (shown in FIG. 3) to control valve 760 to selectively apply different stimulants to the particle 40 being held by the electric field. As a result, different estimates may be applied to the targeted particle 40 in successive fashion as the target particle 40 is rotated and imaged.

FIG. 14 is a flow diagram of an example particle imaging method 800 that may be carried out by system 720. Although method 800 is described in the context of being carried out by system 720, it should be appreciated that method 800 may likewise be carried out with other systems described in this disclosure as well as other similar particle imaging systems.

As indicated by block 804, processor 170 of image generator 736 following instructions contained in medium 172 (shown in FIG. 3) output control signals to valve 760 causing fluid 38 containing target particle 42 be supplied report 778 into flow passage 724. Fluid 38 may additionally include non-targeted particles.

As indicated by block 808, particle levitation instructions 174 cause processor 170 to output control signals causing electrodes 28 to apply an electric field that is balanced with respect to gravity so as to hold, levitate and rotate the targeted particle 40 in an upper zone, within the depth of focus of particle imager 26, while permitting the nontargeted particles 48 to flow past the targeted particle 40 through a second lower zone that is outside the depth of focus of particle imager 28. These non-targeted particles 48 flow through outlet port 780 to waste reservoir 764. At such time, the levitated and rotating particle 40 may be imaged by particle imager 26 and image generator 736.

As indicated by block 812, stimulation instructions contained in medium 172 (shown In 3) may cause the processor 170 of image generator 736 output control signals causing valve 762 supplies a fluid containing a stimulant (from a selected one of stimulant reservoir 752) for the targeted particle 40 to the flow passage 724. The stimulant fluid may flow through flow passage 724, interact with and stimulate the targeted particle 40. The stimulant fluid may then flow out of flow passage 724 into waste reservoir 764.

As indicated by block 816, following such stimulation, imaging instructions 176 may direct the processor 170 of image generator 736 to output control signals causing particle imager 26 to continue to image the now stimulated targeted particle as the particle is being held, levitated and rotated by the electric field. Using the images taken at different points during the rotation of the targeted particle 40, image generator 736 may produce a three-dimensional image of the targeted particle. Three-dimensional image may be stored in image storage 178 (shown in FIG. 3). As indicated by arrow 817, blocks 812 and 816 may be repeated as desired successively apply different stimulants to the same particle 40 as the targeted particle 40 is being held and rotated by the electric field. As a result, image generator 736 may generate multiple three-dimensional images reflecting the impact or effect of different stimulants alone or applied in succession to the targeted particle 40.

Figure 15:
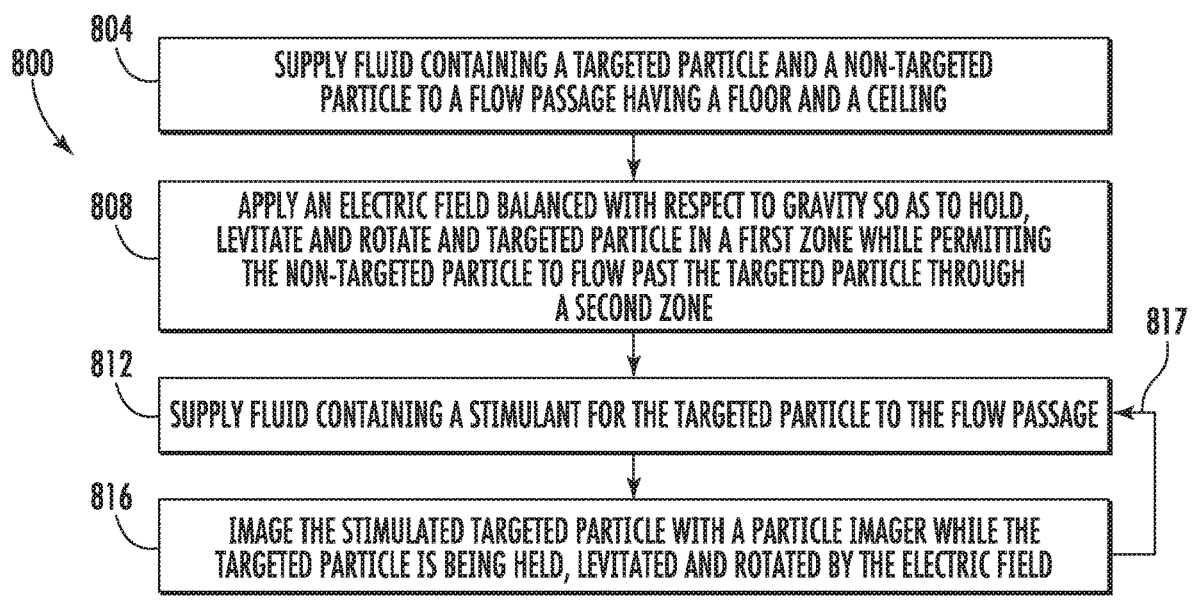
FIG. 15 is a flow diagram of an example particle imaging method.
Figure 16:
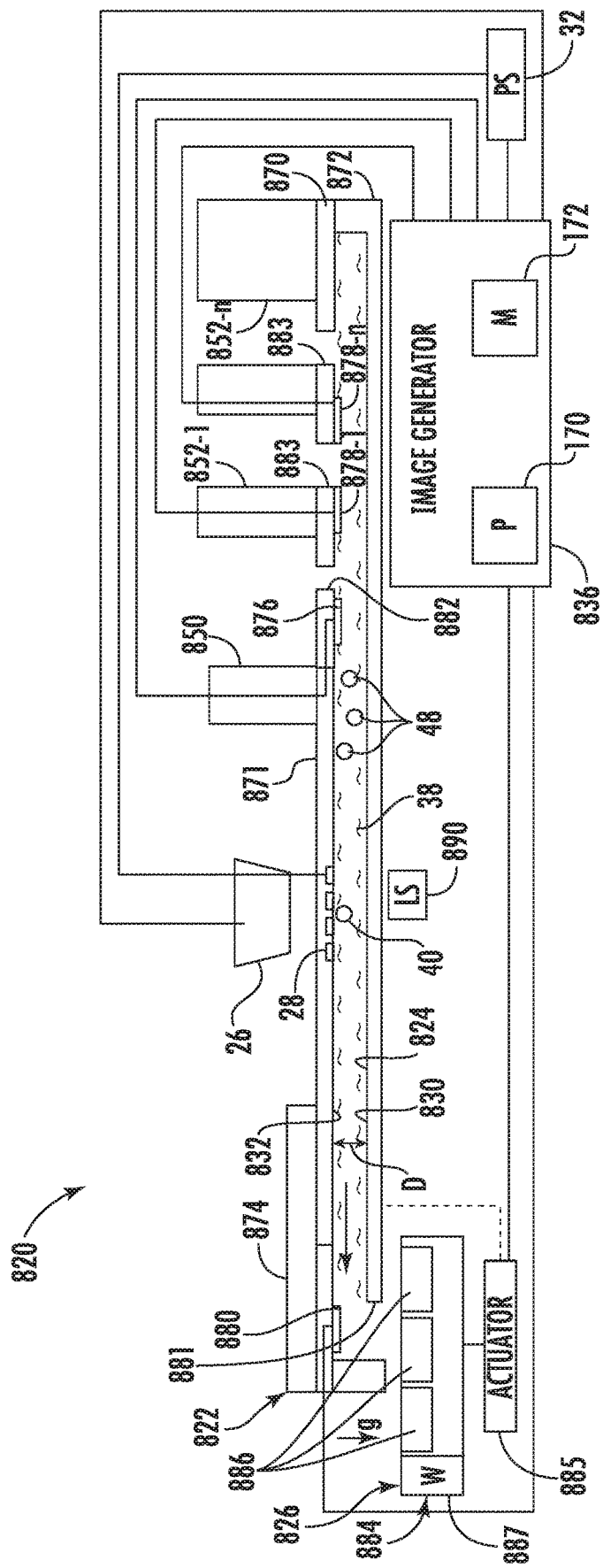
FIG. 16 is a sectional view schematically illustrating portions of an example particle imaging system.

FIG. 15 is a sectional view illustrating portions of an example particle imaging system 820. Imaging system 820 is similar to imaging system 720 in several respects in that imaging system 820 is to selectively apply different stimulants to a particle that is held, levitated and rotated and that is being imaged. System 820 additionally provides for controlled storing the deposition of classified identified particles into a multi-well plate for subsequent retrieval and potential analysis. System 820 comprises microfluidic chip 822, particle imager 26, power source 32, particle storage system 826 and image generator 836.

Microfluidic chip 822 comprises a layer or group of layers forming a microfluidic flow passage through which fluid is directed while being imaged. Microfluidic chip 822 may be formed by performing various microfabrication and/or micromachining processes on a substrate to form and/or connect structures and/or components. The substrate may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components that combine to form or define the microfluidic channel and/or chamber.

In some examples described herein, at least one dimension of a microfluidic flow passage may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels or passages may facilitate capillary pumping due to capillary force. In addition, examples may couple at least two microfluidic channels to a microfluidic output channel via a fluid junction.

In the example illustrated, microfluidic chip 822 comprises substrate 870, transparent lid 871, channel layer 872, support layer 874, fluid pumps 876, 878-1, 878-n, electrodes 28 and fluid actuator 880. Substrate 770 comprise a layer of layers upon which fluid pumps 876, 878 and fluid actuator 880 are formed. In one implementation, substrate 870 may be formed from silicon. In other implementations, substrate 70 may be formed from polymers, ceramics or the like.

Transparent lid 871 comprises a layer of transparent material supported by substrate 870 and/or support layer 874. Transparent lid 871 supports electrodes 28. In one implementation, transparent lid 871 is formed from glass. In another implementation, transparent lid 871 may be formed from a transparent polymer or other transparent materials.

Channel layer 872 is similar to channel layer 772 described above in the channel 872 cooperates with substrate 870 (and transparent lid 871) to form flow passage 824 which extends to an outlet port 881. Flow passage 824 has a floor 830 and a ceiling 832. In the example illustrated, floor 830 is spaced from ceiling 832 by a distance of at least 20 micrometers and no greater than 100 μm. In one implementation, channel layer 872 is formed from a photoresist epoxy, such as SU8. In other implementations, channel aired 72 may be formed from other materials, such as ceramics, glass, polymers or the like.

Support layer 874 comprises a layer supported by substrate 870. Support layer 874 forms cell reservoir 850 and stimulant reservoirs 852-1-852-n (collectively referred to as stimulant reservoirs 852). Cell reservoir 850 and stimulant reservoirs 852 are similar to cell reservoir 750 and stimulant reservoirs 752, respectively, described above. Cell reservoir 850 supplies the fluid 38 into flow passage 824, wherein the fluid 38 may contain a targeted particle 40 as well as nontargeted particles 48. Fluid 38 is applied reservoir 850 through an inlet port 882 extending through substrate 870. Stimulant reservoirs 852 supply different stimulants to flow passage 824 through inlet ports 883 extending through substrate 870. In other implementations, support layer 74 may be omitted, wherein reservoirs 850 and 852, as structures distinct from chip 822, may be moved into sealing engagement with ports 881 and 883.

Fluid pump 876 comprise a pump to draw fluid from cell reservoir 850 into flow passage 824 and to move the fluid along flow passage 824. Similarly, fluid pumps 878 comprise pumps to draw fluid from stimulant reservoirs 852 into flow passage 824 and to move the fluid along flow passages 824. In the example illustrated, fluid pumps 876 and 878 each comprise an inertial pump. In the example illustrated, fluid pumps 876 and 878 each comprise a thermal resistor supported by substrate 870 adjacent to a respective port 881, 883. The thermal resistor is heated to a temperature above the nucleation temperature of the fluid so as to form a bubble. Formation and subsequent collapse of such bubble may generate flow of the fluid. As will be appreciated, asymmetries of the expansion-collapse cycle for a bubble may generate such flow for fluid pumping, where such pumping may be referred to as "inertial pumping." In other implementations, other fluid pumps may be used.

Fluid actuator 880 comprises a mechanism to controllably displace fluid through port 881 as droplets. In the example illustrated, fluid actuator 880 comprises an electrically driven fluid actuator supported by substrate 872 that controllably displaces fluid within flow passage 824 through ejection port 880. In the example illustrated, fluid actuator 80 may comprise a thermal resistive fluid actuator, a piezomembrane based actuator, and electrostatic membrane actuator, mechanical/impact driven membrane actuator, a magneto-strictive drive actuator, and electrochemical actuator, and external laser actuators (that form a bubble through boiling with a laser beam), other such microdevices, or any combination thereof. In the example illustrated, fluid actuator 880 comprises a thermal resistor for serving as a thermal resistive fluid actuator that vaporizes adjacent fluid to form a bubble a displace fluid through port 881.

Particle receiving system 826 receives, stores and separates the different particles 40 for which image data has been acquired. Particle receiving system 826 receives such particles through ejection orifice 880. In the example illustrated, particle receiving system 826 comprises a two-dimensional multi well plate 884 and an actuator 885. Plate 884 comprises a two-dimensional array of wells 886 which may receive individual particles or multiple particles of the same type or classification. In the example illustrated, plate 884 further comprises a waste well or chamber 887 for receiving wash solution and other waste being ejected from the channels 925

Actuator 885 comprises a mechanism to selectively position plate 884 and its wells 886, 887 relative to ejection port 880 for receiving a particle 40 or multiple particles 40. In one implementation, actuator 85 comprises linear actuators in two dimensions such as electrically driven solenoids, hydraulic or pneumatic cylinders or motors. In one implementation, actuator 885 is operably coupled to plate 884 to controllably position plate 884 in two dimensions to selectively position a particular one of wells 886 or well 887 for receiving a particle 40 ejected through orifice 880. As indicated by broken lines, in other implementations, actuator 885 may be operably coupled to chip 822 or a carrier of chip 822 to position orifice 81 with respect to a particular underlying well 886 or well 887. Actuator 885 operates under the control of image generator 836.

Image generator 836 is similar to image generator 736 described above except that in image generator 836 controls fluid pumps 876, 878 in place of valve 760, controls fluid actuator 880 and controls actuator 885. As with image generator 736, image generator 836 controls the application of electrical charge by power supply 32 to electrodes 28 so as to apply a nonuniform nonrotating electric field that attracts holds a targeted particle 40 in an upper zone while the targeted particle 40 is levitated and rotated during imaging by particle imager 26. Non-targeted particles 48 may be carried by fluid flow through a lower zone past the held targeted particle 40 to port 81 where the non-targeted particles 48 are ejected by fluid actuator 880 and with reservoir 887. Images from particle imager 26 are received by image generator 836 which utilize such images to construct a three-dimensional image, such as a three-dimensional volumetric image, of the targeted particle 40. The image or images may be stored for subsequent retrieval and use.

According to one example mode of operation, following instructions contained in medium 172, processor 170 outputs control signals to the pump 876 to move fluid from particle cell reservoir 850 into and along flow passage 824. Image generator 836 further outputs control signals to power source 32 to charge electrodes 28 so as to hold, levitate and spin the targeted particle 40 within flow passage 824 officer to particle imager 26. In some implementations, image generator 836 outputs control signals to a light source 890 to illuminate or excite the particle as it is being rotated. During such rotation, the associated or aligned particle imager 26 captures images of the rotating particle 40 at different angular positions. Signals representing the different images are transmitted to image generator 836. Image generator 836 may use the images to form a 3D volumetric image of the particle as described above with respect to FIGS. 3-8.

The image or the data resulting from such images may be further used to identify or classify the particle. Based upon the image, identification or classification of the particle, image generator 836 causes actuator 885 to selectively position plate 884 opposite to ejection orifice 881. Image generator 836 output signals causing actuator 880 to eject the identified particle into a predetermined one of wells 886. Image generator 960 may store the particular location, the particular well 886 in which the particular identified or classified particle resides, after being ejected into the particular well 886.

In some implementations, imaging system 820 may carry out method 800 described above. For example, as a targeted particle is being held, levitated and rotated within fluid channel 824 by the electric field applied by electrodes 28, image generator 836 may further output control signals causing a selected fluid pump 878 two draw a stimulant fluid from a respective reservoir 852 and to move the stimulant fluid along flow passage 824 size to contact and stimulate the held target particle 40. The stimulated particle 40 may then be imaged as it is being rotated, wherein image generator 836 may generate a three-dimensional image of the targeted particle reflecting the effects of such stimulation. The stimulant fluid may be discharged by fluid actuator 880 into waste reservoir 887. This process may be repeated for multiple stimulants contained in reservoirs 852.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A particle monitoring system comprising:
a flow passage;
a particle imager to image a targeted particle within the flow passage;
electrodes supported proximate the flow passage;
a power source connected to the electrodes; and
a controller to cause the power source to charge the electrodes so as to (1) apply an electric field balanced with respect to gravity so as to hold, levitate and rotate a targeted particle within the flow passage during imaging and (2) release the targeted particle following the imaging,
wherein the flow passage comprises a floor and a ceiling, wherein the controller is to charge the electrodes to hold, levitate and rotate the targeted particle in a first zone spaced from and between the floor and the ceiling while allowing non-targeted particles to flow past the targeted particle through a second zone between the floor and the ceiling.

2. The particle monitoring system of claim 1, wherein the first zone is above the second zone.

3. The particle monitoring system of claim 2, wherein the particle imager has a depth of focus including the first zone while excluding the second zone.

4. The particle monitoring system of claim 2, wherein the electrodes are above the flow passage.

5. The particle monitoring system of claim 2, wherein the electrodes are below the flow passage.

6. The particle monitoring system of claim 1, wherein the first zone is below the second zone.

7. The particle monitoring system of claim 1, further comprising a fluid flow source to provide a fluid stream in the flow passage, wherein the applied electric field is sufficient to retain the targeted particle in the first zone while the non-targeted particle is carried away by the fluid stream.

8. A particle monitoring system comprising:
a flow passage;
a particle imager to image a targeted particle within the flow passage;
electrodes supported proximate the flow passage;
a power source connected to the electrodes;
a controller to cause the power source to charge the electrodes so as to (1) apply an electric field balanced with respect to gravity so as to hold, levitate and rotate a targeted particle within the flow passage during imaging and (2) release the targeted particle following the imaging;
an ejection orifice extending from the flow passage;
a fluid actuator to selectively eject fluid from the flow passage through the ejection orifice;
a multi well plate; and
an actuator coupled to at least one of the ejection orifice and the multi well plate to selectively position the ejection orifice and an individual well of the multi well plate relative to one another for depositing fluid ejected through the ejection orifice into the individual well.

9. A particle monitoring system comprising:
a flow passage;
a particle imager to image a targeted particle within the flow passage;
electrodes supported proximate the flow passage;
a power source connected to the electrodes;
a controller to cause the power source to charge the electrodes so as to (1) apply an electric field balanced with respect to gravity so as to hold, levitate and rotate a targeted particle within the flow passage during imaging and (2) release the targeted particle following the imaging;
a particle reservoir;
a stimulant reservoir; and
an inertial pump to selectively draw fluid from at least one of the particle reservoir and the stimulant reservoir into the flow passage while the targeted particle is being held by the applied electric field.

10. A method comprising:
supplying fluid containing a targeted particle and a non-targeted particle to a flow passage having a floor and a ceiling;
applying, with electrodes, an electric field balanced with respect to gravity so as to hold, levitate and rotate the targeted particle in a first zone between and spaced from the floor and the ceiling and while permitting the non-targeted particle to flow past the targeted particle through a second zone different from the first zone between the floor and the ceiling; and
imaging the targeted particle with a particle imager while the targeted particle is being held, levitated and rotated by the electric field.

11. The method of claim 10 further comprising creating a fluid stream within the flow passage, wherein the applied electric field is sufficient to retain the targeted particle in the upper zone while the non-targeted particle is carried away by the fluid stream.

12. The method of claim 11, comprising:
channeling a first stimulant for the targeted particle through the first zone while the targeted particle is held within the first zone; and
channeling a second stimulant, different than the first stimulant, for the targeted particle through the first zone of the targeted particle is held within the first zone.

13. A non-transitory machine-readable medium containing instructions, the instructions comprising:
particle levitation instructions to direct a processor to output control signals such that an electric field is applied to a fluid stream containing a targeted particle and a non-targeted particle, the electric field being balanced with respect to gravity so as to hold, levitate and rotate the targeted particle in a first zone while permitting the non-targeted particle to flow past the targeted particle in a second zone; and imaging instructions to direct the processor to output control signals to image the targeted particle being rotated within the first zone by the applied electric field.

14. The machine-readable medium of claim 13, wherein the instructions comprise simulation instructions to direct the processor to output control signals causing a stimulant fluid to be channeled through the first zone following retention of the targeted particle by the electric field.

* * * * *